(12) United States Patent
Roggers et al.

(10) Patent No.: US 10,487,231 B2
(45) Date of Patent: Nov. 26, 2019

(54) INKJET DECORATION OF ARCHITECTURAL MATERIALS

(71) Applicant: Electronics for Imaging, Inc., Fremont, CA (US)

(72) Inventors: Robert Roggers, Ypsilanti, MI (US); Natalia Martinez Borras, Castellon de la Plana (ES); Mark Zavada, Wixom, MI (US); Ursula Good, Jackson, MI (US)

(73) Assignee: ELECTRONICS FOR IMAGING, INC., Fremont, CA (US)

( * ) Notice: Subject to any disclaimer, the term of this patent is extended or adjusted under 35 U.S.C. 154(b) by 0 days.

(21) Appl. No.: 15/715,965

(22) Filed: Sep. 26, 2017

(65) Prior Publication Data

US 2018/0086931 A1 Mar. 29, 2018

Related U.S. Application Data

(60) Provisional application No. 62/400,038, filed on Sep. 26, 2016.

(51) Int. Cl.

| | |
|---|---|
| *B41J 2/01* | (2006.01) |
| *C09D 11/38* | (2014.01) |
| *B41J 3/407* | (2006.01) |
| *C09D 11/322* | (2014.01) |
| *C09D 11/10* | (2014.01) |
| *E04D 1/20* | (2006.01) |
| *B41M 5/00* | (2006.01) |
| *E04D 1/00* | (2006.01) |

(52) U.S. Cl.
CPC .............. *C09D 11/38* (2013.01); *B41J 2/01* (2013.01); *B41J 3/407* (2013.01); *C09D 11/10* (2013.01); *C09D 11/322* (2013.01); *E04D 1/20* (2013.01); *B41M 5/007* (2013.01); *B41M 5/0047* (2013.01); *E04D 2001/005* (2013.01)

(58) Field of Classification Search
None
See application file for complete search history.

(56) References Cited

U.S. PATENT DOCUMENTS

| | | | | |
|---|---|---|---|---|
| 5,698,668 | A | * 12/1997 | Bender | .................... C08G 8/28 530/200 |
| 8,932,718 | B2 | 1/2015 | Garner et al. | |
| 2005/0210808 | A1 | 9/2005 | Larson et al. | |
| 2006/0229382 | A1 | 10/2006 | Schweikart et al. | |
| 2007/0077361 | A1 | 4/2007 | Shiao et al. | |
| 2007/0079926 | A1 | 4/2007 | Mehta et al. | |
| 2009/0005494 | A1 * | 1/2009 | Luo | ........................ C04B 41/009 524/502 |

(Continued)

FOREIGN PATENT DOCUMENTS

| | | | |
|---|---|---|---|
| CN | 103351647 | A * | 10/2013 |
| CN | 103351647 | A | 10/2013 |

(Continued)

*Primary Examiner* — Erica S Lin

(74) *Attorney, Agent, or Firm* — Perkins Coie LLP

(57) ABSTRACT

Embodiments of the invention involve printing a ceramic or metal oxide pigmented ink onto asphalt, bitumen, or rubberoid backed roofing materials. Additionally, embodiments of the invention allow for adhesion of the ink to TPO and PVC roofing substrates.

13 Claims, 2 Drawing Sheets

(56) References Cited

U.S. PATENT DOCUMENTS

| | | | |
|---|---|---|---|
| 2009/0311448 A1* | 12/2009 | Takahashi | B41M 5/502 |
| | | | 428/32.28 |
| 2012/0164402 A1 | 6/2012 | Murakami et al. | |
| 2014/0184249 A1* | 7/2014 | Saafi | G01N 17/04 |
| | | | 324/693 |
| 2014/0275317 A1 | 9/2014 | Moussa | |
| 2014/0303318 A1 | 10/2014 | Killilea et al. | |
| 2014/0367881 A1 | 12/2014 | Tethal et al. | |
| 2015/0152273 A1* | 6/2015 | Caillier | C09D 11/30 |
| | | | 524/514 |

FOREIGN PATENT DOCUMENTS

| | | |
|---|---|---|
| CN | 103709830 A | 4/2014 |
| WO | 2005094444 A2 | 10/2005 |
| WO | 2014111608 A1 | 7/2014 |
| WO | 2015115600 A1 | 8/2015 |
| WO | 2016146423 A1 | 9/2016 |

* cited by examiner

INKJET DECORATION OF ARCHITECTURAL MATERIALS

CROSS REFERENCE TO RELATED APPLICATIONS

This application claims priority to U.S. provisional patent application Ser. No. 62/400,038, filed Sep. 26, 2016, which is incorporated herein in its entirety by this reference thereto.

FIELD

The invention relates to inkjet printing. More particularly, the invention relates to inkjet decoration of architectural materials.

BACKGROUND

Asphalt, bitumen, or rubberoid shingles are currently decorated with pre-colored aggregate and/or granules to provide texture and color. The pre-colored aggregate/granules are applied via an analog waterfall technique after asphalt coating, followed by press rolling and finishing. Multiple analog application processes and spot color storage facilities are required to produce a specific design.

Figure 1:
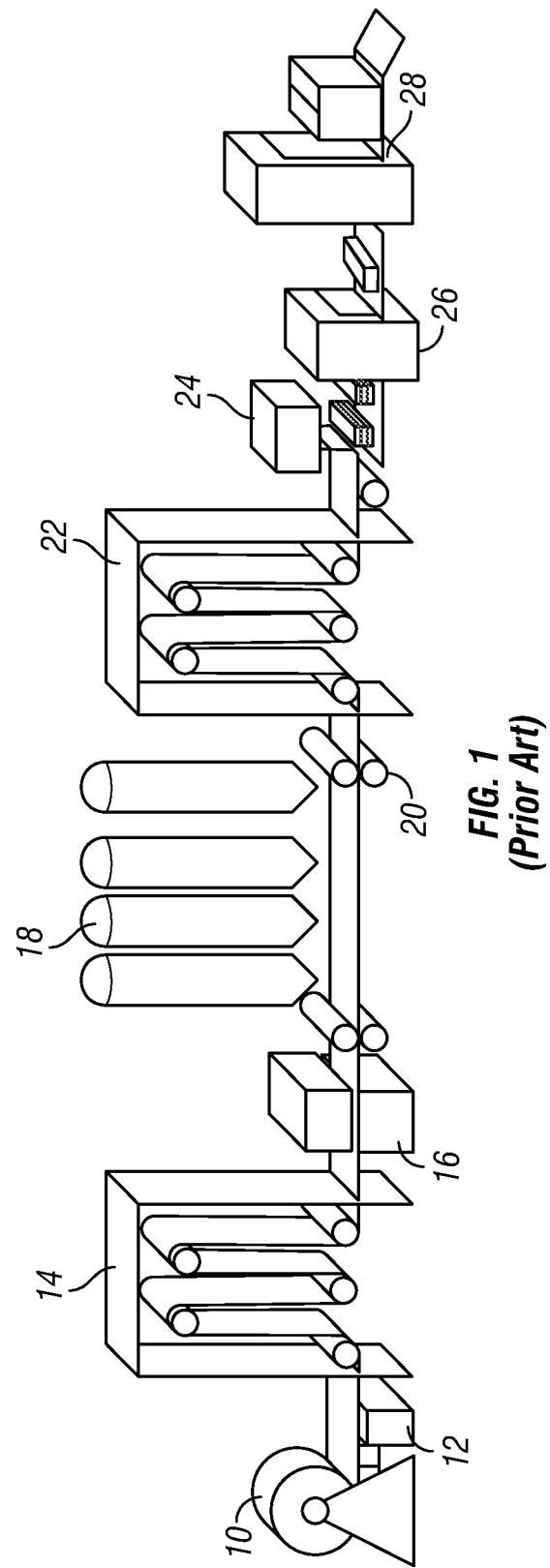

FIG. 1 represents the current method of applying decorative granules to roofing substrates, in which a fiberglass mat 10 is spliced at a splice table 12. The spliced mat is passed to a mat accumulator 14, and then coated with asphalt at an asphalt coater 16. Aggregate/granules are applied to the asphalt coated surface of the fiberglass mat 18. A release tape assembly 20 and cooling assembly 22 further process the now coated mat. Finally, the mat is cut into shingles 24, bundle wrapped 26, and palletized 28. This is shown to highlight some of the limitations of the current method (see, also, http://www.carmeusena.com/sites/default/files/shingelmfg.jpg).

Currently, color is applied more or less at random after the asphalt is applied to the fiberglass mat using pre-colored granules to achieve the desired hue, shade, tint, and tone. The current application method of granules precludes the use of current manufacturing techniques to generate more complex patterns, e.g. wood grain or stone, on the surface of the roofing material.

Patent application no. US2007/0077361, entitled Roofing Articles with Reflective Thin Films and the Process of Producing the Same, relates to the process of improving the infrared reflectance of roofing materials through the vacuum deposition application of silver, aluminum, copper, zinc, tin, gold, palladium, nickel, and alloys thereof. One section of the patent speaks to the possibility of applying a transparent coating of metal and nonmetal oxides to improve the long-term durability of the underlying coating.

PCT patent application no. WO/2005/094444, entitled A Building Membrane, describes thermoset plastics that are used to generate a single-layer coating for different types of building materials, including asphalt or bitumen shingles, as well as tile, slate, wood, and brick materials. The coating may be applied using a variety of techniques, such as flexo, gravure, and inkjet.

Patent application No. US20060229382, entitled Water Based Coloring Agent Preparations for Inkjet Printing, describes a water based-formulation for organic pigments to be inkjetted onto various substrates including roofing shingles. A curable, organic binder system is used to provide adhesion to the substrate and continuity of the film.

U.S. Pat. No. 8,932,718, entitled Coating Systems for Cement Composite Articles, describes a system comprised of latex or epoxy resins, possibly in an aqueous continuous phase, used to coat various architectural materials, specifically cements, cement fiberboard, wood, and glass fiber substrates.

PCT patent application no. WO 2014111608, entitled Coloured Frits with a Lustre Effect, relates to the application of colored, metallic frits that can be applied to ceramic, glass, or metal substrates to provide decoration of the aforementioned substrates. These frits must be fired to achieve the desired effect. The potential for printing on roofing shingles is mentioned in one paragraph. However, no clear method or formulation is outlined specifically for this application.

SUMMARY

Embodiments of the invention involve printing a ceramic or metal oxide pigmented ink onto asphalt, bitumen, or rubberoid backed roofing materials.

Additionally, embodiments of the invention allow for adhesion of the ink to thermoplastic polyolefin (TPO) and polyvinyl chloride (PVC) roofing substrates.

DRAWINGS

Figure 2:
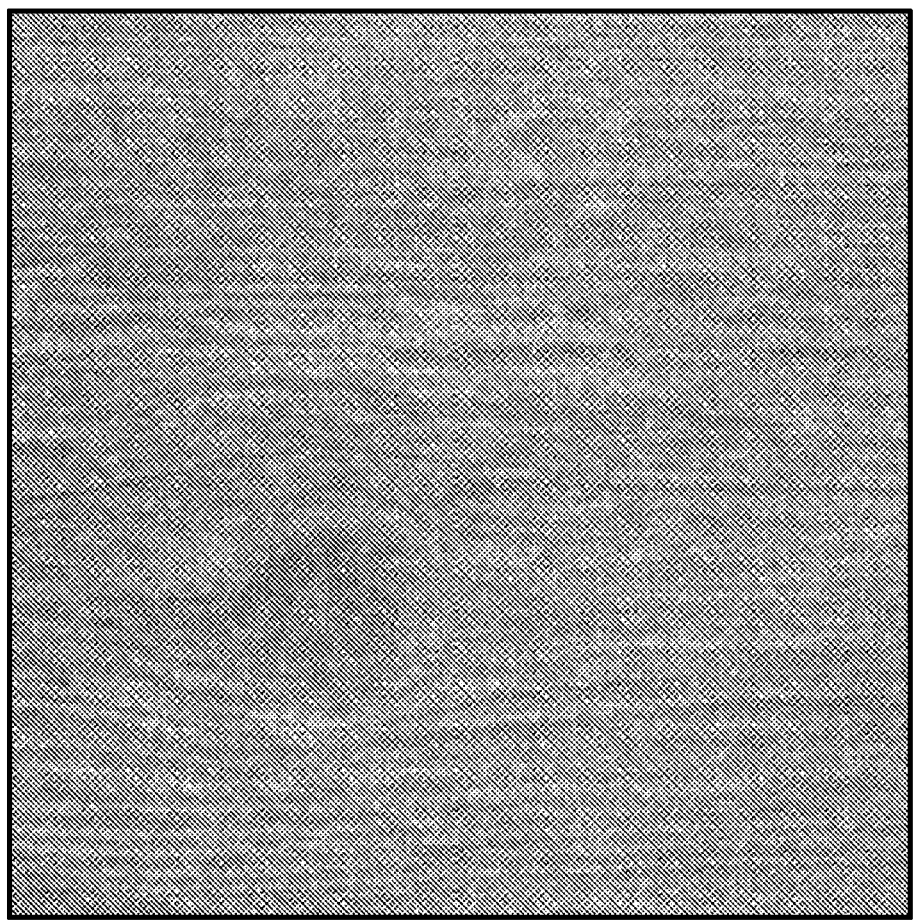

FIG. 1 represents the current method of applying decorative granules to roofing Substrates, and is shown to highlight some of the limitations of the current method; and FIG. 2 represents the ability of the printer and ink to apply more complex patterns on the main substrate, namely roofing substrate with decorative granules.

DESCRIPTION

Embodiments of the invention involve printing a ceramic or metal oxide pigmented ink onto asphalt, bitumen, or rubberoid backed roofing materials. Additionally, embodiments of the invention allow for adhesion of the ink to TPO and PVC roofing substrates.

Using inorganic ink technology for architectural material decoration opens all of the benefits of inkjet technology to this material. The choice of printer depends on the application requirements. A single pass printer, similar to a Cretaprint ceramic tile printer manufactured by EFI, could be used for higher throughput, lower resolution applications. If greater resolution is required, then other commercially available wide format or super-wide format printers could be used. Manufacturing efficiency increases with opportunities for shorter runs.

On-demand printing can lower raw material and finished good inventory levels, and has the potential for lower labor and raw material costs. Inkjet application of inorganic pigments to roofing substrates, as herein described, allows for greater color gamut with enhanced resolution necessary to produce more complex patterns.

Additionally, inks with inorganic pigments have higher light-fastness and weatherability than organic-based pigments. Inorganic pigments also have a natural affinity to roofing granules, eliminating the need for curing/sintering. A geopolymer binder can also be added to the roofing material, either as a component in the ink or as a top-coat to improve light-fastness and long-term weatherability of the printed product further.

Geopolymers may consist of, but are not limited to, silica-oxide (—Si—O—Si—O—), silicaaluminate (—Si—

O—Al—O—), ferro-silica-aluminate (—Fe—O—Si—O—Al—O—) or alumino-phosphate (—Al—O—P—O—). Sources of the geopolymer may be derived from, but are not limited to, metakaolin, silica materials, and/or sol-gel derived materials.

Embodiments of the invention comprise an inkjet ink which can be used to color roofing substrates, specifically the granules used in decoration. With regard to FIG. 1, an embodiment of the invention would provide an inkjet printer within the workflow after aggregate/granules are applied to the asphalt coated surface of the fiberglass mat, either before or after the asphalt cools.

Embodiments of the herein disclosed ink comprise:

1. An inorganic pigment dispersed in an aliphatic ester, glycol ether, water, or hydrocarbon continuous phase in which:

A. There are one or more polymeric hyper-dispersants to achieve stable dispersion; examples of such polymeric hyperdispersants include, but are not limited to, Byk-180, Solsperse J981, Tego 1010, Lamberti Fluijet;

B. There may be silanes or aluminates present to achieve stable dispersions and/or substrate binding including, but not limited to, alkoxy silanes, alkoxy aluminates, calcium aluminates, and colloidal silica;

C. There may be an inorganic binder to aid adhesion of the pigment to the substrate including, but not limited to, colloidal silica, silicone derived materials, hydroxylated clays, calcium alum inates, and hydroxylated alumina;

D. Additives that may help provide desirable properties for ink-jetting, such as viscosity, thermal stability, mechanical stability such as, but not limited to, Rheology modifiers (modified cellulose derivatives, Attagel, Anti-terra U), silicone derived materials, colloidal silicas, clays, and/or surfactants (quaternary amines, siloxanes surfactants, fluorinated hydrocarbons); and E. A binder which allows the ink to adhere to PVC and TPO roofing substrates, for example, but not limited to, chlorinated hydrocarbons, chlorinated surfactants, and/or aromatic hydrocarbons (toluene, alkylated benzenes, alkylated napthalenes.

2. The pigment dispersion is applied to (aggregate/granule) coated roofing substrates by non-impact inkjet printing methods, such as with a digital inkjet.

3. Embodiments of the invention may also include a primer for PVC and TPO roofing substrates that allows the ink to adhere to these substrates such as, but not limited to, chlorinated hydrocarbons, chlorinated surfactants, and/or aromatic hydrocarbons (toluene, alkylated benzenes, alkylated napthalenes).

4. Embodiments of the invention may include a transparent top-coat consisting of geopolymer, silicone, silane, or colorless transparent metal oxides to improve the lightfastness and weatherability of the pigment on the substrate. Geopolymers may consist of, but are not limited to, silica-oxide (—Si—O—Si—O—), silica-aluminate (—Si—O—Al—O—), ferrosilica-aluminate (—Fe—O—Si—O—Al—O—) or alumino-phosphate (—Al—O—P—O—). Sources of the geopolymer may be derived from, but are not limited to, metakaolin, silica materials, and/or sol-gel derived materials.

Example Ink
30-50% wt. continuous phase consisting of fatty acid esters, water, glycol ethers, or hydrocarbons
20-40% wt. pigment for coloration
1-10% wt. hyperdispersant
0-10% wt. geopolymer and/or binder
0-5% wt. surfactants, rheological modifier, and/or silicones Current ceramic ink products can be used with little or no modification. Proof-of-concept samples (see FIGS. 2 and 3) were generated using existing products with no modification whatsoever. This application would increase the volume of ceramic ink produced by 10-15%. This would improve manufacturing efficiency.

Furthermore, in embodiments of the invention inorganic ink technology as herein disclosed could be applied to other architectural decoration markets, including concrete, stone, and masonry substrates. Thus, the additives listed as binders and geopolymers can be used in the same relative ratios as the example ink above. These can be used to provide decoration on these other substrates.

In embodiments of the invention, a wide color gamut is available that provides a full range of colors, shade, or hues as is possible using currently available pigments.

FIG. 2 represents the ability of the printer and ink to apply more complex patterns on the main substrate, namely roofing substrate with decorative granules.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An inkjet ink for coloring architectural substrates, comprising:
   30-50% wt. continuous phase consisting of any of fatty acid esters, water, glycol ethers, or hydrocarbons;
   20-40% wt. pigment for coloration said pigment comprising an inorganic pigment dispersed in said aliphatic ester, glycol ether, water, or hydrocarbon continuous phase;
   1-10% wt. hyperdispersant;
   and
   a binder which allows the ink to adhere to polyvinyl chloride (PVC) and thermoplastic olefin (TPO) roofing substrates, said binder including any of chlorinated hydrocarbons, chlorinated surfactants, and/or aromatic hydrocarbons, including toluene, alkylated benzenes, and alkylated napthalenes.

2. The ink of claim 1, said hyperdispersant comprising:
   one or more polymeric hyper-dispersants.

3. The ink of claim 1, said continuous phase comprising:
   silanes or aluminates present to achieve stable dispersions and/or substrate binding including any of alkoxy silanes, alkoxy aluminates, calcium aluminates, and colloidal silica.

4. The ink of claim 1, said binder further comprising:
   an inorganic binder to aid adhesion of the pigment to the substrate including any of colloidal silica, silicone derived materials, hydroxylated clays, calcium aluminates, and hydroxylated alumina.

5. The ink of claim 1, said ink further comprising:
   additives to help provide desirable properties for ink-jetting, including viscosity, thermal stability, mechanical stability, said additives including any of modified cellulose derivatives, silicone derived materials, colloidal silicas, clays, and/or surfactants, including quaternary amines, siloxanes surfactants, and fluorinated hydrocarbons.

6. The ink of claim 1, further comprising;
a geopolymer binder applied to the substrate as any of a component in the ink or as a top-coat to improve light-fastness and long-term weatherability of the printed substrate.

7. The ink of claim 6, said geopolymer further consisting of any of:
silica-oxide (—Si—O—Si—O—), silicaaluminate (—Si—O—Al—O—), ferro-silica-aluminate (—Fe—O—Si—O—Al—O—) or alumino-phosphate (—Al—O—P—O—), wherein sources of the geopolymer are derived from any of metakaolin, silica materials, and sol-gel derived materials.

8. A method for inkjet application of inorganic pigments to roofing substrates, comprising:
using non-impact inkjet printing methods to apply the inkjet ink of claim 1 to architectural materials.

9. The method of claim 8, said architectural materials comprising any of:
aggregate/granule coated roofing materials, concrete, stone, and masonry substrates.

10. The method of claim 8, further comprising;
applying said inkjet ink to said substrate in a predefined pattern.

11. The method of claim 10, said predefined pattern comprising any of:
woodgrain and stone.

12. The inkjet ink of claim 1, further comprising: up to 10% wt. geopolymer and/or binder.

13. The inkjet ink of claim 1, further comprising:
up to 5% wt. surfactants.

* * * * *